J. H. GOEHST & E. F. HAMILL.
HANGER FOR PIPES AND CABLES.
APPLICATION FILED DEC. 6, 1911.
1,069,937.
Patented Aug. 12, 1913.
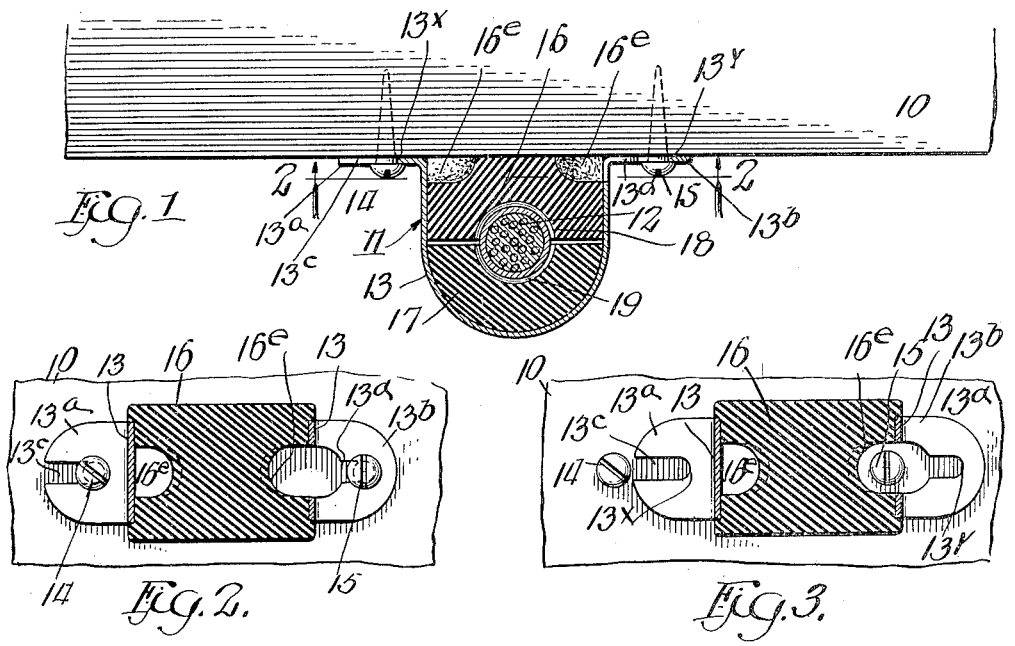
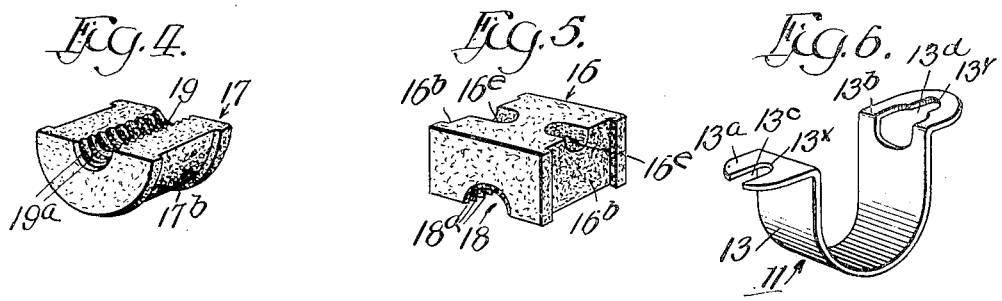
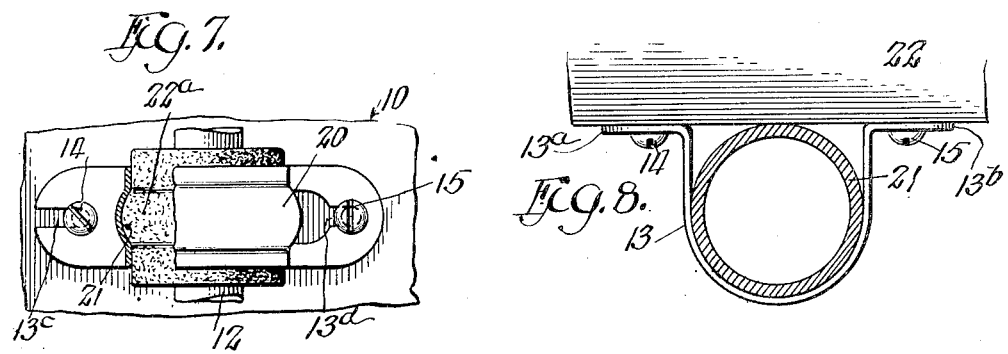
Witnesses:
T. H. Alfreds
H. R. Wilkins
Inventors
John H Goehst
Edward F Hamill
by Poole + Brown Attys

UNITED STATES PATENT OFFICE.

JOHN H. GOEHST AND EDWARD F. HAMILL, OF CHICAGO, ILLINOIS.

HANGER FOR PIPES AND CABLES.

1,069,937.　　　　Specification of Letters Patent.　　Patented Aug. 12, 1913.

Application filed December 6, 1911. Serial No. 664,253.

*To all whom it may concern:*

Be it known that we, JOHN H. GOEHST and EDWARD F. HAMILL, citizens of the United States, and residents of Chicago, in the county of Cook and State of Illinois, have invented certain new and useful Improvements in Hangers for Pipes and Cables; and we do hereby declare that the following is a full, clear, and exact description thereof, reference being had to the accompanying drawings, and to the letters of reference marked thereon, which form a part of this specification.

This invention relates to a novel solid wire cable or pipe-hanger designed for securing a cable or pipe to any suitable support, and the invention consists of the matters hereinafter described and more particularly pointed out in the appended claims.

The object of the invention is to provide a simple and efficient hanger capable of application at any point in the length of a solid wire cable or pipe, and adapted to be readily and easily attached to or detached from the supporting arm or other device intended for carrying the cable or pipe.

In the drawings—Figure 1 is a view showing the improved hanger used to attach an electric cable to a supporting arm and representing a section through the hanger in a plane extending transversely of the cable; Fig. 2 is a view representing a section through the parts shown in Fig. 1 in a plane indicated by the line 2—2 thereof; Fig. 3 is a view similar to that shown in Fig. 2 with the hanger in a different position with reference to its attaching screws; Fig. 4 is a perspective view of one of the insulating blocks used with the hanger when employed in connection with an electric cable; Fig. 5 is a perspective view of an insulating base-block adapted for use with the first named block; Fig. 6 is a perspective view of the hanger; Fig. 7 is a view representing in plan view a modified form of our invention; Fig. 8 is a view showing our improved hanger when used to attach a pipe or conduit to a supporting member.

Referring now to that embodiment of our invention, shown in Figs. 1 to 6, inclusive, of the drawings, 10 indicates a supporting member, such, for example, as a ceiling, partition, switch-board frame or cross-arm of a telegraph or telephone pole; 11, the improved hanger; and 12, a cable which is attached to the supporting member by said hanger. The cable, in this case, consists of a plurality of electric insulated wire conductors inclosed by a flexible lead tube, pipe, rubber or other insulating material.

The hanger 11 consists of a U-shaped metal band 13, provided at its ends with laterally extending arms $13^a$, $13^b$, which are adapted to seat against and to be fastened to the supporting member 10 by means of screws 14, 15. As shown in the drawings, the said attaching arms $13^a$, $13^b$ of the hanger are provided with slots $13^c$, $13^d$, respectively, through which the screws 14 and 15 extend. Said slots are so formed that when the hanger is in its final fixed position, the heads of the screws project laterally beyond the slots and engage against the attaching arms at points at either side of the slots, and when the hanger is shifted in a direction transverse of the cable to a position removed from said final fixed position, the hanger may be withdrawn from the support without the parts of the attaching arms adjacent the slots, striking the screw heads. The slot $13^c$ has a uniform width slightly greater than the diameter of its associated screw 14 but less than the diameter of the head of said screw, and opens at its outer end through the end of the attaching arm $13^b$ in which it is formed. The inner end wall $13^x$ of said slot is adapted to engage the screw 14 when the hanger is in its final fixed position on the supporting member. The slot $13^d$ has an outer end wall $13^y$ adapted to engage the associated screw 15 when the hanger is in its final fixed position. Said slot $13^d$ for a short distance from its outer end wall has a uniform width slightly greater than the diameter of the associated screw 15 and less than the head thereof, but its inner end is enlarged so as to exceed in width the diameter of the screw-head and is preferably extended into the adjacent end of the band 13 so that the hanger may be moved on the support in the plane of the band and transversely of the cable to bring the screw head within the band without its striking against said band. The extension of the slot $13^d$ into the band makes it possible to provide for the necessary movement of the hanger to disengage it from the screws without locating the screw 15 too far from the adjacent end of the band which would tend to permit flexure of the attaching arm at a point between the screw and the said band.

In the present case, the cable 12 is held within the hanger in symmetrically spaced relation with reference to the band 13 and is electrically insulated therefrom by means of an insulating base-block 16 and an insulating cap block 17. Said blocks are formed to fit within the band and the base-block 16 is adapted to seat against the surface of the supporting member 10. The blocks are provided on their adjacent faces with semi-cylindric grooves for receiving the cable, the base-block having a groove 18 and the cap block a groove 19. The surfaces of said grooves are preferably corrugated transversely to provide transverse ribs $18^a$, $19^a$, respectively, for engagement with the outer cylindric surface of the cable so as to prevent its endwise movement with reference to the insulating blocks. To prevent movement of the insulating blocks themselves relatively to the hanger in the direction of the length of the cable, they are provided in their edges adjacent the band 13 with grooves or channels $16^a$, $17^a$, respectively, adapted to receive the band 13. Said grooves provide shoulders $16^b$, $17^b$, at each side of the plane of the band 13 adapted for engagement with its lateral edges. It is apparent that this construction prevents any movement of the blocks with reference to the hanger in the direction of the length of the cable.

In the base-block 16 in line with the slots of the attaching arms of the hanger are formed notches or depressions $16^e$, each opening outwardly through the edge of the base-block and of a depth equal to the depth that the slot $13^d$ in the attaching arm $13^b$, extends into the adjacent end of the band 13. Only the depression adjacent said arm $13^b$ is necessary, but two are provided, one adjacent each edge of the base-block, so that the device may be assembled without attending to the matter as to which edge of the block is placed in position adjacent the proper attaching arm. The provision of these depressions permits the hanger with the insulating blocks in place to be shifted in the manner above described, without the movement being obstructed by the head of the screw striking the base-block 16.

To attach the hanger to its support, the insulating blocks are first engaged in opposite sides of the cable, the base-block 16 being placed with its base toward the surface of the support to which the hanger is to be connected. The hanger is then brought into position with its band 13 in engagement within the grooves 18, 19, in the edges of the insulating blocks 16, 17, and the hanger moved toward the support until its attaching arms come into contact therewith, with the slots $13^c$, $13^d$ of the attaching arms in line with the screws 14 and 15, which may have been previously secured in such position as to bring the cable into proper alinement, when the hanger is in final fixed position. Before thus bringing the parts against the supporting arm, the hanger is brought into such position laterally of the intended final fixed position of the cable that the enlarged part of the slot $13^d$ and the adjacent depression $16^e$ in the base-block 16 are in line with the head of the screw 15. The hanger is then moved laterally with respect to the cable toward the other attaching screw 14 so that the groove $13^c$ is caused to engage with the screw 14 and the narrower part of the groove $13^d$ is caused to engage with the screw 15, the movement being continued until the inner end wall $13^x$ of the groove $13^c$ has been brought into engagement with the screw 14 and at the same time the outer end wall $13^y$ of the groove $13^d$ has been brought into engagement with the screw 15. In this position the heads of the screws overlap and extend laterally beyond the edges of their associated grooves and engage against the attaching arms at points adjacent thereto. The screws are then drawn home which finishes the operation of attaching the hanger in position.

To disengage the hanger from its support for any purpose, a reverse proceeding is had. The screws 14 and 15 are loosened, direction opposite to that described until the hanger moved laterally of the cable in a the groove $13^d$ has been entirely disengaged from the screw 14, and the larger part of the groove $13^d$ has been brought into line with the screw 15 whereupon the hanger may be withdrawn bodily from the support and the insulating blocks removed,—the base-block being first lifted from the cable and the cap block being next lifted from the band after the cable has been raised a slight distance so that the cap block may be thus disengaged.

The two insulating blocks are preferably so proportioned in their dimensions in a direction at right angles to the plane of the attaching arms, that a clamping action of the blocks on the cable is brought about when the base-block and the attaching arms of the hanger are seated against the surface of the support so that the transverse corrugations or ribs in the grooves of said blocks grip or frictionally engage the surface of the cable.

In Fig. 7 we have shown a slightly modified form of the band of the hanger and of the insulating blocks. In this case, 20 indicates the band which has the attaching arms, as before, but which is bent or otherwise formed intermediate its lateral edges to provide a groove 21 adapted to receive rounded ribs $22^a$, formed on the outer edges of the insulation blocks. This construction is for the same purpose heretofore described, namely, to prevent any movement of the insulation blocks relatively to the hanger in the direction of the length of the cable.

In Fig. 8 we have shown the hanger used to attach a pipe or conduit 21 to a support 22. The hanger, in this case, is of the same construction as that shown in Figs. 1 to 6, heretofore described, but the insulation blocks are omitted.

It is apparent that in describing our invention we have referred to details of mechanical construction and arrangement which may be variously modified without departing from the spirit of our invention and we, therefore, do not wish to be limited to such details in any way except as may be pointed out in the appended claims.

We claim as our invention:

1. A hanger for attaching a solid wire cable or pipe to a support consisting of a U-shaped band provided at its ends with laterally projecting attaching arms, said attaching arms each having slots through which attaching devices are adapted to pass, the slot in one attaching arm opening through its outer end and the slot in the other attaching arm being closed at both ends and having a narrow part near the end of the attaching arm and a wider part adjacent the end of the band.

2. A hanger for attaching a cable or pipe to a support consisting of a U-shaped band provided at its ends with laterally projecting attaching arms, said attaching arms each having slots through which attaching devices are adapted to pass, the slot in one attaching arm opening through its outer end and the slot in the other attaching arm being closed at both ends, having a narrow part near the end of the attaching arm and a wider part adjacent the end of the band, said wider part of the slot extending into the band.

3. A hanger for attaching a cable to a support, consisting of a U-shaped band provided at its upper ends with attaching arms adapted to seat against the support, said attaching arms having slots through which the attaching devices are adapted to pass, the slot in one arm opening through its outer end and the slot in the other arm being closed at both ends and having a narrow part near the end of the arm and a wider part adjacent the end of the band, an insulating base-block having a base adapted to seat against the support and provided with a transverse groove to receive the cable, and an insulating cap block provided with a corresponding transverse groove, said blocks at their outer edges engaging within the band of the hanger and said blocks and band being provided with interlocking parts to prevent the movement of said blocks relatively to said hanger in a direction at right angles to the plane thereof.

4. A hanger for attaching a cable to a support, consisting of a U-shaped band provided at its upper ends with attaching arms adapted to seat against the support, said attaching arms having slots, the one, a slot opening through the outer end of the arm, and the other, a slot closed at both ends and having one end extended into the band, an insulating base-block having a base adapted to seat against the support and provided with a transverse groove to receive the cable, said base block having a depression in its base opening through its edge adjacent the attaching arm having the closed slot, and an insulating cap block provided with a corresponding transverse groove, said blocks at their outer edges engaging within the band of the hanger and said blocks and band being provided with interlocking parts to prevent the movement of said blocks relatively to said hanger in a direction at right angles to the plane thereof.

In testimony, that we claim the foregoing as our invention we affix our signatures in the presence of two witnesses, this 27th day of November A. D. 1911.

JOHN H. GOEHST.
EDWARD F. HAMILL.

Witnesses:
GEORGE R. WILKINS,
T. H. ALFREDS.